United States Patent [19]

Luedi et al.

[11] 3,907,371

[45] Sept. 23, 1975

[54] DROP CENTER TRUCK RIM AND METHOD OF FORMING SAME

[75] Inventors: Hans Luedi, Highland Park; Vernon Fencl, Northbrook; Johann T. Hess, Deerfield, all of Ill.

[73] Assignee: Grotnes Machine Works, Inc., Chicago, Ill.

[22] Filed: Dec. 23, 1974

[21] Appl. No.: 535,359

[52] U.S. Cl. ................ 301/96; 29/159.1; 29/421 R
[51] Int. Cl.² .................... B60B 21/00; B60B 25/00
[58] Field of Search .......... 29/159 R, 159.1, 159.01, 29/421 R; 72/54, 57, 60; 301/95, 96, 97

[56] References Cited
UNITED STATES PATENTS

| | | | |
|---|---|---|---|
| 2,139,833 | 12/1938 | LeJeune et al. | 29/159.1 |
| 2,181,848 | 11/1939 | LeJeune et al. | 29/159.1 |
| 2,185,347 | 1/1940 | LeJeune | 29/159.1 |
| 2,586,029 | 2/1952 | Greenshields et al. | 29/159.1 X |
| 2,743,691 | 5/1956 | Cuq | 29/421 X |
| 2,854,743 | 10/1958 | Gollwitzer | 29/159.1 X |
| 3,364,550 | 1/1968 | Jessee et al. | 29/159.1 |

FOREIGN PATENTS OR APPLICATIONS 140,023   6/1948   Australia............................ 29/159.1

Primary Examiner—C. W. Lanham
Assistant Examiner—Victor A. DiPalma
Attorney, Agent, or Firm—Wolfe, Hubbard, Leydig, Voit & Osann, Ltd.

[57] ABSTRACT

A method of forming a drop center truck rim from a flat steel strip rolled into the form of a smooth cylinder and welded together along the abutting axial edges. The weld flash build-up on the smooth cylinder is removed before the cylinder is formed into the desired rim profile. The cylinder is then simultaneously subjected to an axial load and external fluid pressure to force the cylinder radially against an internal die to form a circumferential well in the central portion of the cylinder, while flaring the end portions of the cylinder. Next, the low stress areas of the desired rim profile, which are the end portions of the rim, are shear formed to reduce the thickness of the steel cylinder in the end portions, while retaining the original thickness of the flat strip in the central well. The final rim profile is then produced by roll forming, after which the rim is sized.

12 Claims, 3 Drawing Figures

3,907,371

DROP CENTER TRUCK RIM AND METHOD OF FORMING SAME

DESCRIPTION OF THE INVENTION

The present invention relates generally to the forming of drop center truck rims and, more particularly, to the forming of such rims from flat steel bands.

Heretofore, drop center truck rims have been formed from stock that is pre-formed to the desired rim profile before the stock is rolled and welded to form a rim. This pre-formed stock has been used because it permits the final weight of the rim to be reduced by having thicker sections in the areas where greater stress is encountered during use of the rim, and thinner sections where lower stresses occur. This controlling of the weight of the rim without sacrifice to its strength is highly important since any lessening of the weight of the truck component permits that much more pay load to be carried by the truck over load limited roads as well as apportioning more of the government tax levies on truck weights to the larger pay load. However, because the stock is pre-formed before it is welded, removal of the weld flash build-up after welding is much more difficult than in the case of flat stock. Also, the cost of the pre-formed stock is higher per pound than flat stock, and since profiled rolls are required to produce the pre-formed stock, the stock is generally available from only a limited number of sources.

Drop center truck rims have also been formed from flat stock heretofore. The flat stock, of course, is more readily available and at a lower cost per pound than pre-formed stock, and it also makes it relatively easy to remove weld flash build-up from the welded rims before they are formed into the desired longitudinal profile. However, when the desired profile has been formed in the flat band, the resulting rim has excess metal in the low stress areas where it is not really needed and, therefore, the rim has unnecessary and excessive weight.

It is, therefore, a primary object of the present invention to provide an improved method of forming drop center truck rims from flat stock which is not pre-formed, and yet producing a variable thickness along the rim profile so that the rim does not have excess weight. Thus, a related object of the invention is to provide such a method for using flat stock to form drop center truck rims having reduced metal thickness in the areas of low stress.

It is another object of this invention to provide an improved method for forming drop center truck rims from flat stock which produces little or no thinning of the metal during forming of the well area, which is the area where the greater stresses are encountered during use of the rim.

A further object of the invention is to provide an improved method of producing drop center truck rims which results in material savings as high as 10 to 20 per cent.

Yet another object of the invention is to provide an improved method of the foregoing type which also offers all the advantages of starting with flat stock, such as ease of removal of weld flash, lower unit cost and more readily available starting material.

A still further object of the invention is to provide an improved method of forming drop center truck rims which can be carried out rapidly and efficiently to achieve high production rates.

Other objects and advantages of the invention will be apparent from the following detailed description and the accompanying drawings, in which.

While the invention will be described in connection with a certain preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
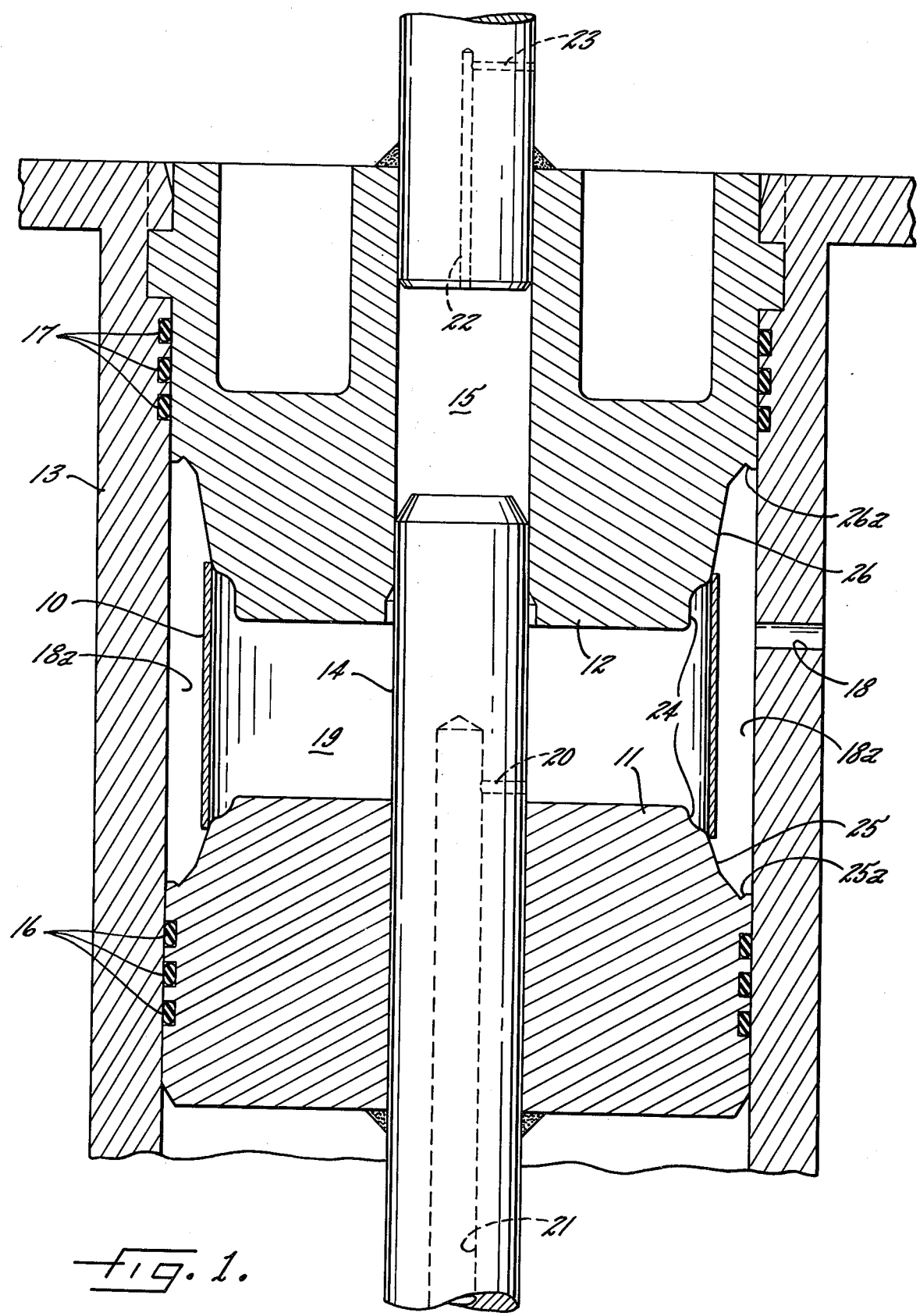
FIG. 1 is a fragmentary sectional view of a work station for carrying out the initial forming of a flat steel band rolled into the form of a cylinder and welded together along the abutting axial edges, before the forming operation has been initiated.

Turning now to the drawings, and referring first to FIG. 1, the method of this invention starts with a flat steel strip which has been rolled into the form of a smooth cylinder 10 and welded together along the abutting axial edges. Subsequent to the welding operation, but prior to the forming of the desired rim profile in the smooth cylinder 10, the weld flash build-up can be easily removed by grinding or milling the welded seam along the smooth surface of the cylinder. This is in contrast to the difficulties presented by weld flash build-up on a cylinder formed from stock which has been pre-formed to the desired rim profile.

In accordance with one aspect of the present invention, the forming of the rim profile is initiated by flaring the end portions of the smooth cylinder radially outwardly by a pair of internal dies. Thus, in the illustrative embodiment of FIGS. 1 and 2, the flat cylinder 10 is seated on a pair of cooperating dies 11 and 12 within a stationary cylinder 13. The die 12 is fixed to the cylinder 13, while the die 11 is mounted for axial movement within the cylinder 13 by a hydraulic actuator (not shown) acting on a rod 14 secured to the die 11. To ensure proper registry between the two dies 11 and 12 during axial movement of the die 11 relative to the die 12, the rod 14 on which the movable die 11 is carried extends through the die 11 and into a mating bore 15 in the stationary die 12. As the die 11 is advanced toward the die 12, the end portions of the cylinder 10 are flared outwardly by the die surfaces 25 and 26 until the ends of the cylinder abut a pair of stops 25a and 26a at opposite ends of the die cavity.

In keeping with the invention, the forming of the flared cylinder is continued by applying fluid pressure to the external surface of the cylinder to deform the central portion of the cylinder radially inwardly against the internal dies to form a circumferential well in the central portion of the cylinder, while maintaining a compressive axial load on the cylinder. Thus, with the movable die 11 in its partially advanced position where the ends of the cylinder 10 first abut the stops 25a and 26a, the space between the dies is filled with liquid at a controlled pressure through an entry port 18. Sealing rings 16 and 17 are provided along the outer surfaces of the dies 11 and 12, respectively, to prevent the escape of this liquid along the interface between the dies and the cylinder 13, while the cylinder 10 blocks the flow of liquid between the cylinder and the dies 11 and 12. Consequently, the liquid contained in the space 18a on the outside of the cylinder 10 cannot escape and, therefore, exerts a controlled inward radial force against the cylinder 10 in response to further advancing movement of the die 11. Any liquid in the space 19 inside the cylinder 10 can escape through a port 20 and longitudinal passageway 21 in the rod 14, and also through a passageway 22 and port 23 formed in the supporting rod for the stationary die 12 to permit escape of liquid from the bore 15.

Figure 2:
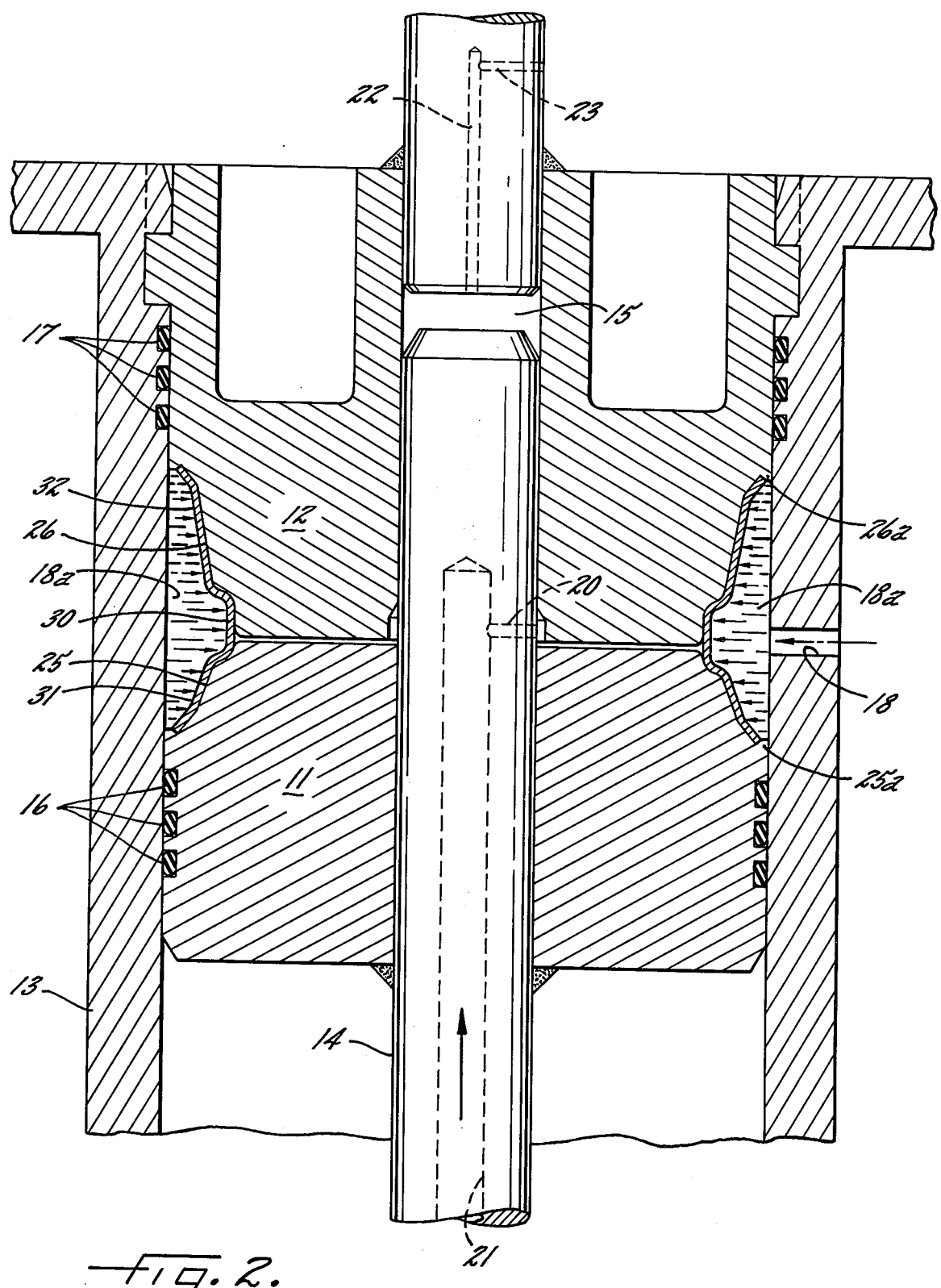
FIG. 2 is a view of the same work station illustrated in FIG. 1 after the forming operation has been completed.

Thus, as the movable die 11 moves from its intermediate position where the cylinder first engages the stops 25a and 26a, to the advanced position shown in FIG. 2, the liquid in the exterior space 18a forces the cylinder 10 into conformity with the profile of the two mating dies 11 and 12. In the central portion of the cylinder 10, the dies form a circumferential well 24 into which the cylinder 10 is deformed by the liquid pressure while a compressive axial load is maintained on the cylinder by the advancing die 11. Consequently, the cylinder 10 is "collapsed" into the central well 24 by the combined action of the axial load produced by axial movement of the die 11 toward the die 12 and the radial load produced by controlled pressure in the cavity 18. That is, as the cylinder 10 is deformed into the central well 24, the axial length of the cylinder is reduced so that the radial deformation of the metal does not reduce its thickness. This is important because the area of greatest stress in a truck rim is in the central well, particularly in the corners of the well. As the movable die 11 is advanced subsequent to the introduction of the pressurized liquid, the radially outward load applied to the end portions of the cylinder 10 by the die surfaces 25 and 26 also tends to flex or bow the cylinder in the longitudinal direction to further facilitate the inward deformation of the central portion of the cylinder into the circumferential well 24.

Figure 3:
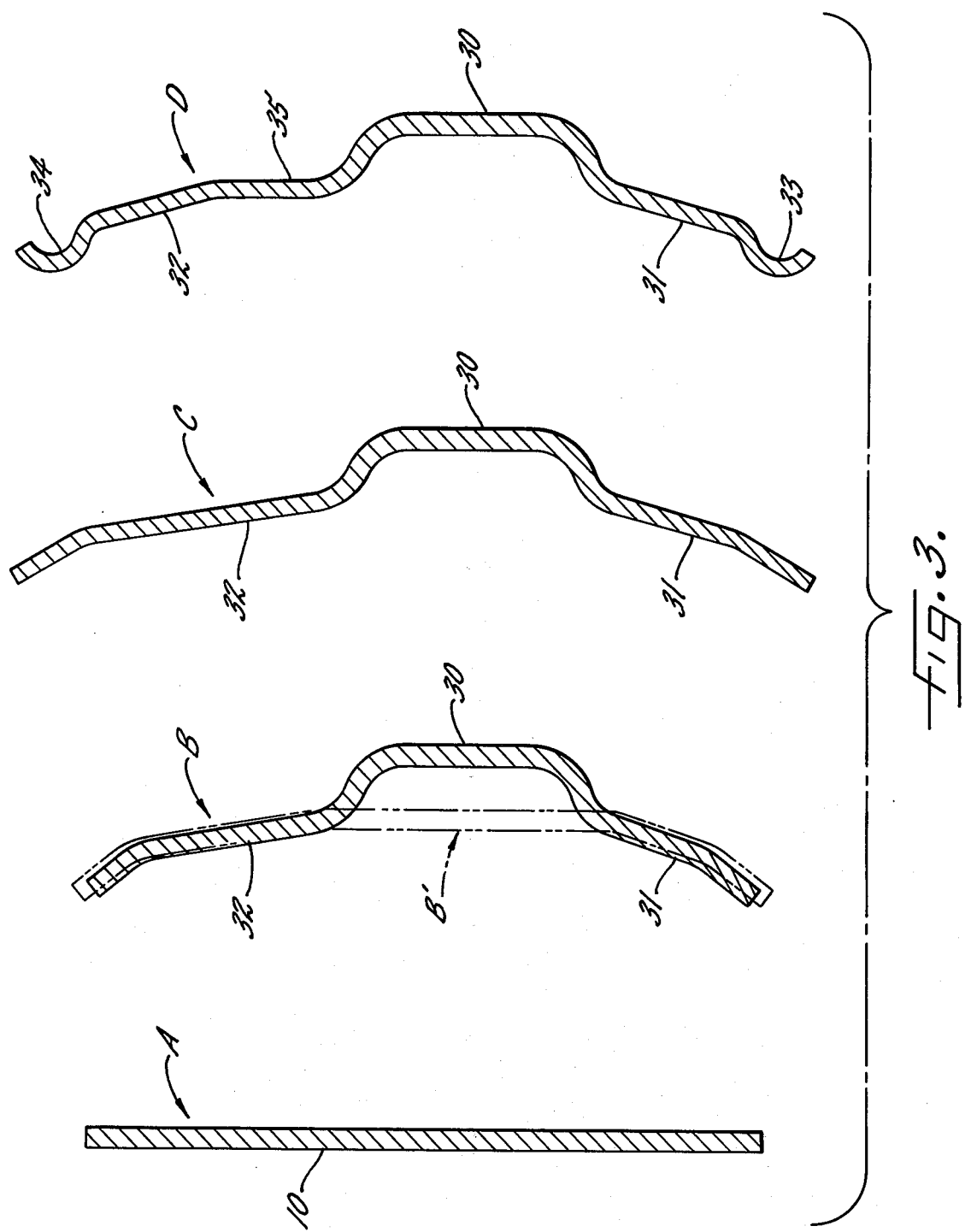
FIG. 3 is a sequence of cross sectional views of the truck rim formed in accordance with the method of the present invention showing the profile of the rim after each successive step of the method.

In FIG. 3, the cross-sectional configuration of the rim is illustrated at successive stages of the forming method provided by this invention. Thus, section A is the original smooth cylinder 10 shown in FIG. 1. Section B represents the cross section of the cylinder as shown in FIG. 2, after it has been subjected to the compressive axial loading and external fluid pressure described above in connection with FIGS. 1 and 2. Section B, illustrated in broken lines, represents the section produced by the initial axial movement of the dies alone, prior to introduction of the pressurized liquid. It can be seen that the flared end portions 31 and 32 of the rim are formed by the axial movement of the dies, while the central well 30 is formed by the combined action of the axial movement of the dies 11 and 12 and the liquid pressure in the cavity 18. The end portion 31 has flare angles of 39° and 10° and the end portion 32 has flare angles of 39° and 19° in the illustrated example, but it will be appreciated that these angles are not critical and may be easily changed by the use of different dies.

In accordance with a further aspect of this invention, the partially formed rim produced by the compressive axial loading and external fluid pressure is next subjected to shear forming to reduce the thickness, and extend the axial length, of the low stress areas of the rim profile. These low stress areas are the end portions 31 and 32 of the rim on opposite sides of the central circumferential well 30. In addition to thinning and shaping the metal, the cold working effected by the shear forming hardens the metal in the end positions 31 and 32 of the rim. This shear forming step may be carried out by conventional and well known shear forming equipment which need not be illustrated herein.

The section C shown in FIG. 3 illustrates the configuration of the rim after it has been subjected to the shear forming step. It can be seen that the shear forming not only reduces the thickness of the end portions 31 and 32 of the rim (by about 19% in the illustrative example), but also increases the axial lengths of these end portions. An inherent result of the shear forming is a reduction in the flare angles of the end portions of the rim, which must be taken into account in the design of the dies 11 and 12. For example, in the illustrative embodiment of FIG. 3, the flare angles of portion 31 are reduced from 39° and 19° to 30° and 15° by the shear forming, and the flare angles of the other end portion 32 are reduced from 39° and 10° to 30° and 9°, respectively. It will be noted that the shear forming has no effect whatever on the circumferential well 30 in the center of the rim, which is the high stress area where maximum metal thickness is desired.

To complete the rim, it is subjected to a roll forming operation to produce the desired final profile illustrated as Section D in FIG. 3. It can be seen that the main function of this roll forming step is to curl the edge portions 33 and 34 of the rim to produce the standard peripheral configuration for automotive rims. In addition, the roll forming flattens the inner portion of the previously flared end portion 32, as indicated at 35 in Secction D of FIG. 3. As in the case of the shear forming operation, the roll forming may be carried out by conventional and well known equipment which need not be illustrated herein.

Subsequent to the final roll forming step the rims may be sized by conventional techniques, which typically involves expanding or shrinking of the rim. Of course, the rim may also be subjected to any other desired final treatments.

As can be seen from the foregoing detailed description, this invention provides an improved method of forming a drop center truck rim from flat stock which is not pre-formed, and yet it produces a variable thickness along the rim profile so that the rim does not have excessive weight. The final rim retains the original thickness of the flat stock in the area of greatest stress, which is the center well, while reducing the thickness in the lower stress areas between the center well and the ends of the rim. With this method, material savings on the order of 10 to 20 percent can be realized. Thus, the method offers the advantage of reduced rim weight previously obtained by the use of pre-formed stock, while at the same time offering all the advantages of starting with flat stock, such as ease of removal of weld flash build-up, lower unit costs, and more readily available starting material. Furthermore, as will be apparent from FIGS. 1 and 2, the forming steps can all be carried out rapidly and efficiently to achieve high production rates.

We claim as our invention:

1. A method of forming a drop center truck rim from a flat steel strip rolled into the form of a smooth cylinder and welded together along the abutting axial edges, said method comprising the steps of positioning a die along the internal surface of the cylinder, said die forming a circumferential well adjacent the central portion of the cylinder, applying fluid pressure to the external surface of the cylinder while applying a compressive axial load to the ends of the cylinder to deform the cylinder radially inwardly against the internal die and thereby form a circumferential well in the central portion of the cylinder.

2. A method of forming a drop center truck rim as set forth in claim 1 wherein the end portions of the cylinder are flexed radially outwardly during the application of said fluid pressure and compressive axial load to facilitate the inward deformation of the central portion of the cylinder.

3. A method of forming a drop center truck rim as set forth in claim 1 wherein the end portions of the cylinder are flared radially outwardly prior to application of the fluid pressure.

4. A method of forming a drop center truck rim as set forth in claim 1 wherein weld flash is removed from the rolled and welded strip before the smooth cylinder is formed into the desired rim profile.

5. A method of forming a drop center truck rim as set forth in claim 1 wherein the low stress areas of the rim are shear formed to reduce the thickness of the steel cylinder in such areas.

6. A method of forming a drop center truck rim from a flat steel strip rolled into the form of a smooth cylinder and welded together along the abutting axial edges, said method comprising the steps of
  a. applying external fluid pressure to the smooth cylinder while applying a compressive axial load to the ends of the cylinder to force the cylinder radially inward against an internal die and thereby form a circumferential well in the central portion of the cylinder,
  b. shear forming the low stress areas of the desired rim profile so as to reduce the thickness of the steel cylinder in such areas,
  c. and roll forming the other areas of the desired rim profile so as to retain the original thickness of the steel strip in such areas.

7. A method of forming a drop center truck rim as set forth in claim 6 wherein the low stress areas that are shear formed are the end portions of the rim so that the original strip thickness is retained in the circumferential well in the central portion of the rim.

8. A method of forming a drop center truck rim as set forth in claim 6 wherein weld flash is removed from the rolled and welded strip before the resulting smooth cylinder is formed into the desired rim profile.

9. A method of forming a drop center truck rim as set forth in claim 6 wherein the ends of said cylinder are flared prior to application of said external fluid pressure.

10. A method of forming a drop center truck rim as set forth in claim 6 which includes the step of sizing the final formed rim.

11. A method of forming a drop center truck rim as set forth in claim 1 wherein the original rolled flat steel strip has a uniform thickness along its entire length.

12. A drop center truck rim formed by rolling a flat steel strip into the form of a smooth cylinder and welded together along the abutting axial edges of the strip, removing weld flash from the smooth cylinder, applying external fluid pressure to the smooth cylinder while applying a compressive axial load to the ends of the cylinder to force the cylinder radially against an internal die and thereby form a circumferential well in the central portion of the cylinder, shear forming the low stress areas of the desired rim profile so as to reduce the thickness of the steel cylinder in such areas, and roll forming the other areas of the desired rim profile so as to retain the original thickness of the steel strip in such areas.

* * * * *